United States Patent [19]

McGibbon et al.

[11] Patent Number: 5,286,774
[45] Date of Patent: Feb. 15, 1994

[54] AQUEOUS COMPOSITIONS

[75] Inventors: Graeme McGibbon, Whitley Bay; Julie E. Robinson, Stockton on Tees, both of England

[73] Assignee: Tioxide Specialties Limited, London, England

[21] Appl. No.: 919,274

[22] Filed: Jul. 27, 1992

[30] Foreign Application Priority Data

Jul. 27, 1991 [GB] United Kingdom ............. 9116267.7

[51] Int. Cl.$^5$ .................... C08K 3/10; C08L 25/14; C09B 11/00
[52] U.S. Cl. .................... 524/398; 524/382; 524/386; 524/399; 556/40; 556/54
[58] Field of Search ............... 524/398, 399, 386, 382; 556/40, 54

[56] References Cited

U.S. PATENT DOCUMENTS

| | | | |
|---|---|---|---|
| 2,984,641 | 5/1961 | Wolinski | 524/398 |
| 4,609,746 | 9/1986 | Barfurth et al. | 556/40 |
| 4,617,408 | 10/1986 | Nestler et al. | 556/40 |
| 4,647,680 | 3/1987 | Barfurth et al. | 556/40 |
| 4,909,846 | 3/1990 | Barfurth et al. | 556/54 |

FOREIGN PATENT DOCUMENTS

| | | |
|---|---|---|
| 1244232 | 3/1969 | United Kingdom . |
| 1244233 | 3/1969 | United Kingdom . |
| 1362054 | 10/1971 | United Kingdom . |
| 1350420 | 12/1971 | United Kingdom . |
| 1354423 | 12/1971 | United Kingdom . |
| 2161817 | 1/1986 | United Kingdom . |
| 2207426 | 7/1988 | United Kingdom . |

*Primary Examiner*—Paul R. Michl
*Assistant Examiner*—Olga Asinovsky
*Attorney, Agent, or Firm*—Baker & Botts

[57] ABSTRACT

An aqueous composition suitable for use as a printing ink is provided which comprises an aqueous solution or emulsion of a film-forming polymer containing a titanium compound which is the reaction product of a titanium orthoester, a beta-diketone and a dihydric alcohol.

Preferably the composition also contains a pigment or dye and other conventional printing ink additives.

The titanium compounds enhance the adhesion and heat resistance properties of the compositions and in contrast to known additives do not lose their efficacy when the ink is stored for more than a few hours.

20 Claims, No Drawings

AQUEOUS COMPOSITIONS

This invention relates to aqueous compositions useful as printing inks and particularly to aqueous compositions incorporating titanium compounds.

Aqueous based printing inks are increasingly used since their use avoids the emission of organic solvents to the atmosphere.

However, it is difficult to formulate aqueous printing inks with a satisfactory heat resistance and adhesion to many substrates, particularly plastics films.

Known adhesion promoters and/or heat resistance additives for aqueous printing inks frequently have the disadvantage of losing their effectiveness if the ink containing them is stored for more than a few hours. Therefore they need to be mixed with the other ingredients of the ink just before the ink is printed. This is inconvenient and can be inefficient since any ink not used quickly does not posses satisfactory adhesion and/or heat resistance.

Compounds such as diisopropoxytitanium bis(2,4-pentanedionate) which are useful for increasing adhesion and heat resistance in solvent based inks are generally ineffective in aqueous inks since they react with the water in the ink.

It is an object of this invention to provide an aqueous composition for use as a printing ink and having good heat resistance and good adhesion to plastics films. It is a further object to provide a composition in which the adhesion and heat resistance remains satisfactory over an extended period.

According to the invention a composition for use as a printing ink comprises an aqueous emulsion or aqueous solution of a film forming polymer and a titanium compound comprising the reaction product of a titanium orthoester, a beta-diketone and a dihydric alcohol.

Preferably, the composition contains, in addition, a pigment and any other additive normally used in aqueous printing inks.

Also according to the invention a method of preparing a printing ink comprises mixing an aqueous emulsion or aqueous solution of a film forming polymer, a pigment and a titanium compound comprising the reaction product of a titanium orthoester, a beta-diketone and a dihydric alcohol.

The compositions of the present invention include as an essential ingredient the reaction product of a titanium orthoester, a beta-diketone and a dihydric alcohol. The titanium orthoester has the general formula Ti(OR)$_4$ and usually R represents an alkyl group. Preferably, R contains up to 8 carbon atoms and, more preferably, up to 6 carbon atoms. Examples of titanium orthoesters useful in the composition include tetraethyl titanate, tetraisopropyl titanate, tetra-n-butyl titanate and tetrakis(2-ethylhexyl) titanate.

The beta-diketone used to produce the titanium compound has the general structure:

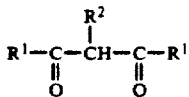

in which R$^1$ represents an aliphatic or aromatic hydrocarbyl group, an aliphatic or aromatic substituted hydrocarbyl group, an alkoxy group or a substituted alkoxy group and R$^2$ represents hydrogen, an alkyl group or a substituted alkyl group. Preferably R$^1$ and R$^2$ each contain less than 8 carbon atoms. The two R$^1$ groups in the beta-diketone may be the same or different. Examples of suitable beta-diketones include 2,4-pentanedione, 2,4-hexanedione, ethyl acetoacetate, diethyl malonate and dibenzoylmethane. More than one beta-diketone can be used to form the titanium compound useful in the invention.

Dihydric alcohols used to form the titanium compounds of use in the composition of the invention can have a number of different structures. When the hydroxy groups are attached to adjacent carbon atoms the dihydric alcohols are generally referred to as 1,2-diols and when the carbon atoms to which the hydroxy groups are attached are separated by one or two carbon atoms the dihydric alcohols are known as 1,3-diols or 1,4-diols respectively. This terminology is used to indicate the relative positions of the hydroxy groups in the molecule and not the absolute positions. In this invention 1,2-diols, 1,3-diols and 1,4-diols are preferred with 1,3-diols being most preferred. Examples of dihydric alcohols of use include 1,2-ethanediol, 1,2-propanediol, 1,3-propanediol, 1,4-butanediol and 2-methyl-2,4-pentanediol. More than one dihydric alcohol can be used to form the titanium compound.

Although the term "dihydric alcohol" is used herein to describe compounds containing at least two hydroxy groups compounds containing more than two hydroxy groups (polyhydric alcohols) such as glycerol and pentaerythritol are also useful in this invention.

In the most preferred embodiment of the invention the titanium compound is a reaction product of a titanium orthoester, acetylacetone (2,4-pentanedione) and 1,3-propanediol.

Preferably, the titanium compound is the reaction product formed from one or more titanium orthoesters, one or more beta-diketones and one or more dihydric alcohols as the only ingredients.

The molar ration Ti:beta-diketone can vary from 1:0.5 to 1:4 but preferably the ratio is about 1:2. The molar ratio of Ti:dihydric alcohol can vary from 1:0.5 to 1:10 and preferably is from 1:1 to 1:4. When the Ti:beta-diketone ratio is about 1:2 then the Ti:dihydric alcohol ratio is preferably about 1:1.

The reaction of a titanium orthoester with the beta-diketone and with the dihydric alcohol produces the parent alcohol from which the titanium orthoester is derived (for example, isopropyl alcohol from tetraisopropyl titanate). In the titanium compounds used in this invention this alcohol can be allowed to remain in the reaction mixture or can be removed, for example by distillation.

Any suitable method can be employed to prepare the titanium compound of the invention. Typically, the beta-diketone is slowly added to the titanium orthoester and the mixture is stirred. The dihydric alcohol is added subsequently and, if desired, the free alcohol produced from the titanium orthoester is removed by distillation.

An aqueous emulsion or solution of any suitable film-forming polymer is a second essential component of the composition of the invention. Generally the polymer is a polymer which has been found to be useful in aqueous printing inks such as acrylic and styrene-acrylic polymers and shellac-supported polystyrene.

The composition also usually contains one or more pigments and/or one or more dyes and typical pigments which can be used are the coloured inorganic pigments, white inorganic pigments and coloured organic pigments. Organic dyes can be used to render the ink an appropriate colour and often are used in conjunction with an opacifying white inorganic pigment such as titanium dioxide. It will be seen however that the printing ink of the present invention need not necessarily include a pigment and/or a dye.

The compositions of the present invention usually contain the reaction product of the titanium orthoester in an amount of up to 10% by weight of the total weight of ink and preferably in an amount of 1 to 6% by weight of the ink.

The compositions of the present invention can contain other additives such as defoamers, solubilizing bases, plasticisers, slip and scuff additives, levelling agents etc.

The compositions of the present invention are of particular use as inks for printing substrates formed of polyethylene or co-extruded polypropylene/polyethylene film or sheets where adhesion of the ink to the substrate is particularly important. The compositions also have good adhesion to other films such as polyvinylidene dichloride coated plastics material and good heat resistance when used on many substrates including plastics films and paper.

The adhesion of compositions of the current invention can be assessed in a number of ways. One convenient test consists of printing the composition onto a plastics film and allowing the printed coating to dry. An adhesive tape is then applied to the coating and pressure is applied to the tape to ensure good contact. The tape is quickly removed from the coating and a visual assessment made of the proportion of coating which remains on the plastics film.

A further test, known as the "wet crinkle" test is used to assess adhesion when the printed film is wet. This test is fully described hereinafter in the Examples.

Heat resistance is assessed by heating printed substrate in a laboratory heat-sealer. This test is fully described hereinafter in the Examples.

It has been found that the compositions of this invention generally develop optimum properties approximately 24 hours after the compositions are prepared. This is illustrated in some of the following examples where the above-mentioned tests are carried out approximately 24 hours after preparing the compositions.

The invention is illustrated by the following Examples:

EXAMPLE 1

To a round bottom flask equipped with a stirrer, water-cooled condenser and containing tetraisopropyl titanate (71 g, 0.25 mole) a small quantity of 2,4-pentanedione (5 g) was added. The reaction flask was then placed in a water bath and a further 45 g of 2,4-pentandione was added over a 45 minute period ensuring the reaction temperature did not exceed 40° C. To this mixture propane-1,3-diol (19 g, 0.25 mole) was added slowly over a 20 minute period, ensuring the reaction temperature did not exceed 40° C.

An aqueous ink was prepared to the following formulation:

|  | Parts by weight |
| --- | --- |
| Mill Base | |
| Acrylic resin solution (Joncryl 61) | 9.92 |
| Water | 7.44 |
| iso-Propanol | 7.44 |
| Defoamer (Dispelair CF 87) | 0.80 |
| Titanium dioxide (Tioxide RHD-2) | 34.72 |
| Let-down | |
| Acrylic resin emulsion (Joncryl 80) | 39.68 |
|  | 100.00 |

('Joncryl', 'Dispelair', and 'Tioxide' are Trade Marks.)

The ingredients comprising the mill base were mixed together on a ball mill for 16 hours and then the let-down was mixed in and the ball milling continued for a further 2 hours.

To 100 parts by weight of the above ink were added 4 parts by weight of the reaction product of this example.

The adhesion characteristics of this ink were compared with those of the same ink not containing the product of this example (control ink), using the following standard tape test:

Duplex drawdowns of both inks were produced with a No. 1K bar (wire wound applicator) on Shorko SCB film (corona discharge treated, co-extruded polypropylene film). The film was then dried in an oven at 80° C. for 60 seconds and allowed to cool to room temperature. A strip of Scotch tape (3M Co) was applied down the length of the treated film covering both inks. Twenty four hours later the tape was ripped from the surface of both inks simultaneously down the direction of the original drawdown. The proportion of ink removed from the film was observed for each ink.

It was apparent that very little ink containing the titanium compound (treated ink) was removed whereas approximately half the control ink was removed by the adhesive tape.

In the "wet crinkle" test, separate drawdowns of the treated and untreated inks were produced and dried in a manner similar to that described above. After standing for 24 hours at room temperature, the printed film was gripped between the fingers and palms of the hands with a distance of approximately 10 cm between the hands. The hands were then brought together, folding the film printed side in between the knuckles. With this film held under a running cold water tap the hands were rubbed together in a circular motion in the plane of the finger joints under moderate pressure. After 50 circular cycles, the film was assessed for percentage ink remaining in the area of scuffing.

Virtually none of the treated ink was removed by this process whereas it was observed that almost all of the untreated control ink was removed after only 10 cycles in the same test.

Heat resistance was determined with the aid of a BCL Laboratory Heat Sealer. Individual drawdowns were prepared as described above. The dried films were then folded in two, printed side to printed side and placed between the heated (160° C.) jaws of the heat sealer under a pressure of 25 psi (172 kPa) for one second dwell time. The films were then inspected for ink transfer. None of the treated ink had become detached from the substrate whereas more than half of the control ink transferred to one side.

EXAMPLE 2

A titanium compound was prepared in manner similar to that described in Example 1 from tetra-iso-propyl titanate (71 g, 0.25 mole), 2,4-pentandione (50 g, 0.5 mole) and propane-1,2-diol (19 g, 0.25 mole).

An ink similar to that of Example 1 was prepared using the titanium compound prepared by the method of this example and tested similarly.

In the adhesion test none of the treated ink was removed from the film whereas almost half the control ink was removed. In the heat resistance test only a small amount of the treated ink was detached from the substrate but almost all the control ink was transferred to one side.

EXAMPLE 3

A titanium compound was prepared using the apparatus of Example 1 from tetra-iso-propyltitanate (71 g, 0.25 mole), 2,4-pentanedione (50 g, 0.5 mole) and butane-1,4-diol (22.53 g, 0.25 mole).

An ink was prepared similar to that of Example 1 using the titanium compound of this example and tested similarly.

In the adhesion test less than one quarter of the treated ink was removed from the film whereas almost half the control ink was removed. In the heat resistance test very little of the treated ink was detached from the substrate but almost all the control ink was transferred to one side.

EXAMPLE 4

A titanium compound was prepared in apparatus as described in Example 1 from tetra-iso-propyltitanate (71 g, 0.25 mole), 2,4-pentanedione (50 g, 0.5 mole) and glycerol (34.5 g, 0.375 mole).

An ink was prepared similar to that of Example 1 using the titanium compound of this example and tested similarly.

In the adhesion test approximately one quarter of the treated ink was removed from the film whereas almost half the control ink was removed. In the heat resistance test less than one quarter of the treated ink was detached from the substrate but almost all the control ink was transferred to one side.

EXAMPLE 5

A titanium compound was prepared in apparatus as described in Example 1 from tetra-iso-propyltitanate (71 g, 0.25 mole), 2,4-pentanedione (50 g, 0.5 mole) and propane-1,3-diol (28.5 g, 0.375 moles).

An ink was prepared similar to that of Example 1 using the titanium compound of this example and tested similarly.

In the adhesion test virtually none of the treated ink was removed from the film whereas approximately half the control ink was removed. In the heat resistance test none of the treated ink was detached from the substrate but more than half the control ink was transferred to one side.

EXAMPLE 6

A titanium compound was prepared in apparatus as described in Example 1 from tetra-iso-propyltitanate (71 g, 0.25 mole), 2,4-pentanedione (50 g, 0.5 mole) and 2-methyl-2,4-pentanediol (29.5 g, 0.25 moles).

An ink was prepared similar to that of Example 1 using the titanium compound of this example and tested similarly.

In the adhesion test virtually none of the treated ink was removed from the film whereas approximately half the control ink was removed. In the heat resistance test none of the treated ink was detached from the substrate but more than half the control ink was transferred to one side.

EXAMPLE 7

A titanium compound was prepared in apparatus as described in Example 1 from tetra-n-butyl titanate (85 g, 0.25 moles), 2,4-pentanedione (50 g, 0.5 mole) and propane-1,2-diol (19 g, 0.25 moles).

An ink was prepared similar to that of Example 1 using the titanium compound of this example and tested similarly.

In the adhesion test none of the treated ink was removed from the film whereas about one third of the control ink was removed. In the heat resistance test only a small amount of the treated ink was detached from the substrate but almost all the control ink was transferred to one side.

EXAMPLE 8

A titanium compound was prepared in apparatus as described in Example 1 from tetra-n-butyl titanate (85 g, 0.25 moles), 2,4-pentanedione (50 g, 0.5 mole) and propane-1,2-diol (28.5 g, 0.375 moles).

An ink was prepared similar to that of Example 1 using the titanium compound of this example and tested similarly.

In the adhesion test none of the treated ink was removed from the film whereas about one third of the control ink was removed. In the heat resistance test only a small amount of the treated ink was detached from the substrate but almost all the control ink was transferred to one side.

EXAMPLE 9

A titanium compound was prepared in apparatus as described in Example 1 from tetra-iso-propyltitanate (71 g, 0.25 mole), 2,4-pentanedione (50 g, 0.5 mole) and di-butylethanolamine (37.25 g, 0.25 mole).

An ink was prepared similar to that of Example 1 using the titanium compound of this example and tested similarly.

In the adhesion test approximately one quarter of the treated ink was removed from the film whereas almost half the control ink was removed. In the heat resistance test less than one quarter of the treated ink was detached from the substrate but almost all the control ink was transferred to one side.

EXAMPLE 10

A titanium compound was prepared in apparatus as described in Example 1 from tetra-iso-propyltitanate (71 g, 0.25 mole), 2,4-pentanedione (50 g, 0.5 mole) and neo-pentylglycol (26 g, 0.25 mole).

An aqueous ink was prepared to the following formulation:

| Water | 102.9 g |
| --- | --- |
| Acrylic resin solution (ICI BT20) | 166.2 g |
| Defoamer (Foamex 3062) | 0.29 g |
| iso-Propanol | 11.6 g |

The above ingredients were mixed together and monoethanolamine (2.9 g) added to give rise to a clear varnish.

To the varnish the following ingredients were stirred in:

| Water | 35 g |
| --- | --- |
| Defoamer (Foamex 3062) | 2.3 g |
| Wetting agent (Solsperse 20000) | 17.3 g |
| iso-Propanol | 23.1 g |

After all the above ingredients had been thoroughly mixed in titanium dioxide (Tioxide RTC-90), 173.4 g, was added with the aid of a high speed mixer (Silverson) to yield the final ink.

('BT20', 'Foamex', 'Solsperse' and 'Tioxide' are Trade Marks.)

To 100 parts by weight of the above ink were added 4 parts by weight of the titanium compound of this example.

Tests as described in Example 1 were carried out on a sample of the ink containing the titanium compound (treated ink) and on a control ink containing no titanium compound.

In the adhesion test less than half of the treated ink was removed from the film whereas all the control ink was removed. In the heat resistance test very little of the treated ink was detached from the substrate but approximately three quarters of the control ink was transferred to one side.

EXAMPLE 11

A titanium compound was prepared in apparatus as described in Example 1 from tetra-iso-propyltitanate (71 g, 0.25 mole), 2,4-pentanedione (50 g, 0.5 mole) and butane-1,3-diol (22.5 g, 0.25 moles).

A modified ink as described in Example 10 containing the product of this example was prepared and tested as described in Example 1.

In the adhesion test less than half of the treated ink was removed from the film whereas all the control ink was removed. In the heat resistance test very little of the treated ink was detached from the substrate but more than three quarters of the control ink was transferred to one side.

EXAMPLE 12

The titanium compound described in Example 1 was added to the ink described in Example 11 and the resulting ink was tested as described in Example 1.

In the adhesion test none of the treated ink was removed from the film whereas approximately half the control ink was removed. In the heat resistance test none of the treated ink was detached from the substrate but almost all the control ink was transferred to one side. In the wet crinkle test virtually none of the treated ink was removed whereas almost all the control ink was observed to have been removed after about 10 cycles.

EXAMPLE 13

The titanium compound described in Example 1 was added to the ink described in Example 1 and left for 24 hours at room temperature. Ink tests were carried out in the same manner as that described in Example 1.

In the adhesion test none of the treated ink was removed from the film whereas approximately half the control ink was removed. In the heat resistance test none of the treated ink was detached from the substrate but almost all the control ink was transferred to one side.

EXAMPLE 14

The titanium compound described in Example 5 was added to the ink described in Example 1 and left for 24 hours at room temperature. Ink tests were carried out in the same manner as that described in Example 1.

In the adhesion test none of the treated ink was removed from the film whereas approximately half the control ink was removed. In the heat resistance test none of the treated ink was detached from the substrate but almost all the control ink was transferred to one side. In the wet crinkle test virtually none of the treated ink was removed whereas almost all the control ink was observed to have been removed after about 10 cycles.

We claim:

1. A printing ink composition comprising an aqueous emulsion or aqueous solution of a film-forming polymer selected from the group consisting of acrylic polymers, styrene-acrylic polymers, or shellac-supported polystyrene polymers, and a titanium compound comprising the reaction product of a titanium orthoester, a beta-diketone and a dihydric alcohol.

2. A composition according to claim 1 in which the titanium orthoester has the formula $Ti(OR)_4$ wherein R represents an alkyl group containing up to 8 carbon atoms.

3. A composition according to claim 2 in which R represents an alkyl group containing up to 6 carbon atoms.

4. A composition according to claim 1 in which the beta-diketone is selected from the group consisting of 2,4-pentanedione, 2,4-hexanedione, ethyl acetoacetate, diethyl malonate and dibenzoylmethane.

5. A composition according to claim 1 in which the dihydric alcohol is a 1,2-diol, a 1,3-diol or a 1,4-diol.

6. A composition according to claim 5 in which the dihydric alcohol is selected from the group consisting of 1,2-ethanediol, 1,2-propanediol, 1,3-propanediol, 1,4-butanediol and 2-methyl-2,4-pentanediol.

7. A composition according to claim 1 in which the dihydric alcohol contains more than two hydroxyl groups.

8. A composition according to claim 1 in which the molar ratio of titanium:betadiketone in the titanium compound is from 1:0.5 to 1:4.

9. A composition according to claim 8 in which the molar ratio is approximately 1:2.

10. A composition according to claim 1 in which the molar ratio Ti:dihydric alcohol in the titanium compound is from 1:0.5 to 1:10.

11. A composition according to claim 10 in which the molar ratio is from 1:1 to 1:4.

12. A composition according to claim 1 in which the molar ratio Ti:betadiketone in the titanium compound is approximately 1:2 and the molar ratio Ti:dihydric alcohol in the titanium compound is approximately 1:1.

13. A composition according to claim 1 in which the titanium compound is prepared by reacting a titanium orthoester, a betadiketone and a dihydric alcohol and removing by-product alcohol.

14. A composition according to claim 1 in which the titanium compound is present in an amount of up to 10% by weight with respect to total weight of the composition.

15. A composition according to claim 14 in which the amount of titanium compound is from 1 to 6% by weight.

16. A composition according to claim 1 additionally comprising a pigment or a dye.

17. A composition according to claim 16 in which the pigment is titanium dioxide.

18. A composition according to claim 1 additionally comprising a defoamer, a plasticiser, a slip additive, a solubilising base, a scuff additive or a levelling agent.

19. A method of preparing a printing ink comprising mixing an aqueous emulsion or aqueous solution of a film forming polymer, a pigment and a titanium compound comprising the reaction product of a titanium orthoester, a betadiketone and a dihydric alcohol.

20. A method according to claim 19 in which the titanium compound is prepared by slowly adding the betadiketone to the titanium orthoester and subsequently adding the dihydric alcohol.

* * * * *